United States Patent
Sprainis et al.

(10) Patent No.: US 8,336,209 B2
(45) Date of Patent: Dec. 25, 2012

(54) METHOD OF MAKING COMPRESSIBLE ELASTOMERIC SPRING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp, Wilmerding, PA (US)

( * ) Notice: Subject to any disclaimer, the term of this patent is extended or adjusted under 35 U.S.C. 154(b) by 1273 days.

(21) Appl. No.: 12/150,929

(22) Filed: May 1, 2008

(65) Prior Publication Data

US 2008/0271318 A1 Nov. 6, 2008

Related U.S. Application Data

(60) Provisional application No. 60/926,987, filed on May 1, 2007.

(51) Int. Cl.
*B23P 13/00* (2006.01)
*F16F 7/00* (2006.01)

(52) U.S. Cl. .................... 29/896.93; 29/896.9; 29/432.2; 29/432.1; 213/40 R; 248/300; 267/141.1

(58) Field of Classification Search .................. 29/896.9, 29/896.91, 896.93; 248/200, 300, 618; 267/141.1, 267/153; 213/40 R
See application file for complete search history.

(56) References Cited

U.S. PATENT DOCUMENTS

| | | | | |
|---|---|---|---|---|
| 2,140,441 A | * | 12/1938 | Clark | 248/27.3 |
| 3,279,048 A | * | 10/1966 | Grove et al. | 29/432 |
| 3,293,106 A | * | 12/1966 | Cocco et al. | 428/137 |
| 3,602,465 A | * | 8/1971 | Velut | 248/616 |
| 4,198,037 A | | 4/1980 | Anderson | |
| 5,335,403 A | * | 8/1994 | Jensen | 29/896.91 |
| 5,351,844 A | | 10/1994 | Carlstedt | |

FOREIGN PATENT DOCUMENTS

| | | |
|---|---|---|
| DE | 1993283 | 9/1968 |
| SU | 777278 | 11/1980 |
| SU | 894258 | 12/1981 |

* cited by examiner

*Primary Examiner* — Sarang Afzali
(74) *Attorney, Agent, or Firm* — James Ray & Assoc

(57) ABSTRACT

A method of making a compressible elastomeric spring including at least one compressible elastomeric pad enclosed by a pair of metal plates includes the steps of forming plates with a center aperture and a plurality of prongs positioned about a peripheral edge thereof, forming each end of the pad with an axial projection and abutting groove, aligning the plurality of prongs with each respective projection and respective groove and applying axial force to one end of the spring to frictionally interlock the plurality of prongs with such projection and groove. The method also provides for making a multi-tiered stack of pads separated by plates in the above described manner and pre-shortening the spring prior to installation into the conventional yoke. The above described method additionally improves axial straightness and lateral stability of the multi-tiered spring assembly.

8 Claims, 5 Drawing Sheets

METHOD OF MAKING COMPRESSIBLE ELASTOMERIC SPRING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate for A Compressible Elastomeric Spring", to co-pending U.S. Ser. No. 12/150,928 entitled "Elastomeric Pad For A Compressible Elastomeric Spring", to U.S. Ser. No. 12/150,925 entitled "Method Of Making Elastomeric Pad For A Compressible Elastomeric Spring" now issued as U.S. Pat. No. 7,981,348 on Jun. 26, 2011, to co-pending U.S. Ser. No. 12/150,777 entitled "Combination Yoke and Elastomeric Draft Gear", to U.S. Ser. No. 12/150,808 entitled "Combination Yoke and Elastomeric Draft Gear Having A Friction Mechanism" now issued as U.S. Pat. No. 8,096,431 on Jan. 17, 2012, and to U.S. Ser. No. 12/150,927 entitled "Elastomeric Draft Gear Having A Housing" now issued as U.S. Pat. No. 8,096,432 on Jan. 17, 2012, filed concurrently herewith. These applications are being assigned to the assignee of the present invention and the disclosures of these co-pending applications are hereby incorporated by reference thereto.

FIELD OF THE INVENTION

The present invention relates, in general, to compressible elastomeric springs capable of absorbing energy and, more particularly, this invention relates to a method for making elastomeric compressible spring.

BACKGROUND OF THE INVENTION

Compressible elastomeric springs, including a multi-tiered stack of elastomeric pads separated by plates, have been extensively employed for absorbing energy and have gained wide acceptance for absorbing and cushioning buff and draft dynamic impact forces encountered during make-up and operation of a railway vehicle. U.S. Pat. No. 4,198,037 to Anderson and U.S. Pat. No. 5,351,844 to Carlstedt disclose related prior art methods of making compressible elastomeric springs.

Carlstedt is particularly concerned with a method of improving center-grip metal plate and its mechanical interlocking to an elastomeric pad in order to improve lateral stability of the compressible elastomeric spring.

However, further improvements are required in the method of mechanically interlocking the plate to the elastomeric pad during a cold forming process and improving axial straightness and lateral stability of the compressible elastomeric spring, particularly enabling the spring to absorb and cushion higher levels of buff and draft dynamic impact force.

SUMMARY OF THE INVENTION

In accordance with one aspect, the present invention provides a method of making a compressible elastomeric spring. The method includes the step of providing at least one compressible elastomeric pad defining a central axis and having a pair of axial ends. Each of the pair of axial ends has each of a substantially flat surface disposed normal to the central axis and a central raised projection formed thereon. Next, providing a pair of plate like members. Each of the pair of plate like members has at least one substantially flat surface, one of an aperture and a cavity provided in at least one substantially flat surface thereof and a predetermined plurality of prongs positioned about a peripheral edge of such one of the aperture and cavity and extending at a predetermined angle relative to at least one substantially flat surface of each plate like member. Then, positioning such at least one pad between the pair of plate like members. Axially aligning the predetermined plurality of the prongs of each plate like member with a respective central projection. Finally, forming the compressible elastomeric spring.

In accordance with another aspect, the present invention provides a method of making a multi-tiered compression spring assembly including a predetermined plurality of axially disposed compressible elastomeric pads, a first end plate on one end of the assembly, a second end plate on an opposed end of the assembly and a separator plate between each pair of adjacent compressible elastomeric pads. The method includes the step of forming each plate with an axial aperture. Next, forming a predetermined plurality of prongs about a peripheral edge of the axial aperture. Then, extending the predetermined plurality of prongs at a predetermined angle relative to a surface of the plates which is in juxtaposition to one of the predetermined plurality of compressible elastomeric pads. Positioning the plates and the predetermined plurality of compressible elastomeric pads to form the multi-tiered compression spring assembly. Next, applying a predetermined axial force to the multi-tiered compression spring assembly. Then, piercing, with the predetermined plurality of prongs and the applied force, an axial end of a respectively juxtaposed compressible elastomeric pad. Penetrating, with the predetermined plurality of prongs and the applied force, a predetermined distance into such respectively juxtaposed compressible elastomeric pad. Next, mechanically interlocking, by way of the prong penetration, the predetermined plurality of compressible elastomeric pads with the plates. Finally, removing the axial force from the multi-tiered compression spring assembly.

In accordance with a further aspect, the present invention discloses a method of providing at least one of axial straightness and lateral stability in a multi-tiered compression spring assembly during repetitive cushioning of axial dynamic impact loads in excess of 7,500 pounds per square inch (PSI) and in absence of a center rod or peripheral guidance. The spring assembly includes a predetermined plurality of axially disposed compressible elastomeric pads formed from a preselected copolyester polymer having a modified molecular structure and having a predetermined shape factor and a separator plate between each pair of adjacent compressible elastomeric pads. The method includes the step of forming each axial end of each of the predetermined plurality of pads with an axial projection. Next, forming each axial end with a groove in abutting relationship with a peripheral side surface of the axial projection. Then, forming each separator plate with an axial aperture and with a predetermined plurality of prongs positioned about a peripheral edge of the axial aperture and extending at a predetermined angle relative to a surface of each separator plate which is in juxtaposition to one of the compressible elastomeric pads. Next, positioning the separator plates and the predetermined plurality of compressible elastomeric pads to form the multi-tiered compression spring assembly. Then, aligning the predetermined plurality of prongs with each of a respective axial projection and groove. Applying a predetermined axial force to one end of the multi-tiered compression spring assembly. Next, piercing, with the predetermined plurality of prongs and the applied force, each of an exterior surface of the axial projection and a surface of the groove of a respectively juxtaposed compressible elastomeric pad. Then, penetrating, with the predetermined plurality of prongs and the applied force, a predetermined distance into the respectively juxtaposed compressible elastomeric pad. Mechanically interlocking, by way of the prong penetration, the predetermined plurality of compressible elastomeric pads with the plates. Finally, removing the axial force from the multi-tiered compression spring assembly.

OBJECTS OF THE INVENTION

It is, therefore, one of the primary objects of the present invention to provide a method of making a compressible elastomeric spring including an elastomeric pad positioned between a pair of plates.

Another object of the present invention is to provide a method of making a compressible elastomeric spring stack of elastomeric pads separated by plates that improves mechanical interlocking of the metal plates to the compressible elastomeric pad.

Yet another object of the present invention is to provide a method of making a compressible elastomeric spring stack of elastomeric pads separated by plates that improves axial straightness of the stack during use.

A further object of the present invention is to provide a method of making a compressible elastomeric spring stack of elastomeric pads separated by plates that improves lateral stability of the stack during use.

Yet a further object of the present invention is to provide a method of making a compressible elastomeric spring stack of elastomeric pads separated by plates that does not require use of center rod or axial guiding during use.

An additional object of the present invention is to provide a method of making a compressible elastomeric spring stack of elastomeric pads separated by plates that enables the spring to absorb and cushion higher dynamic impact forces during make-up and operation of a railway vehicle.

Another object of the present invention is to provide a method of pre-shortening a compressible elastomeric spring stack of elastomeric pads separated by plates prior to installation of the spring into a conventional yoke of a railway vehicle.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
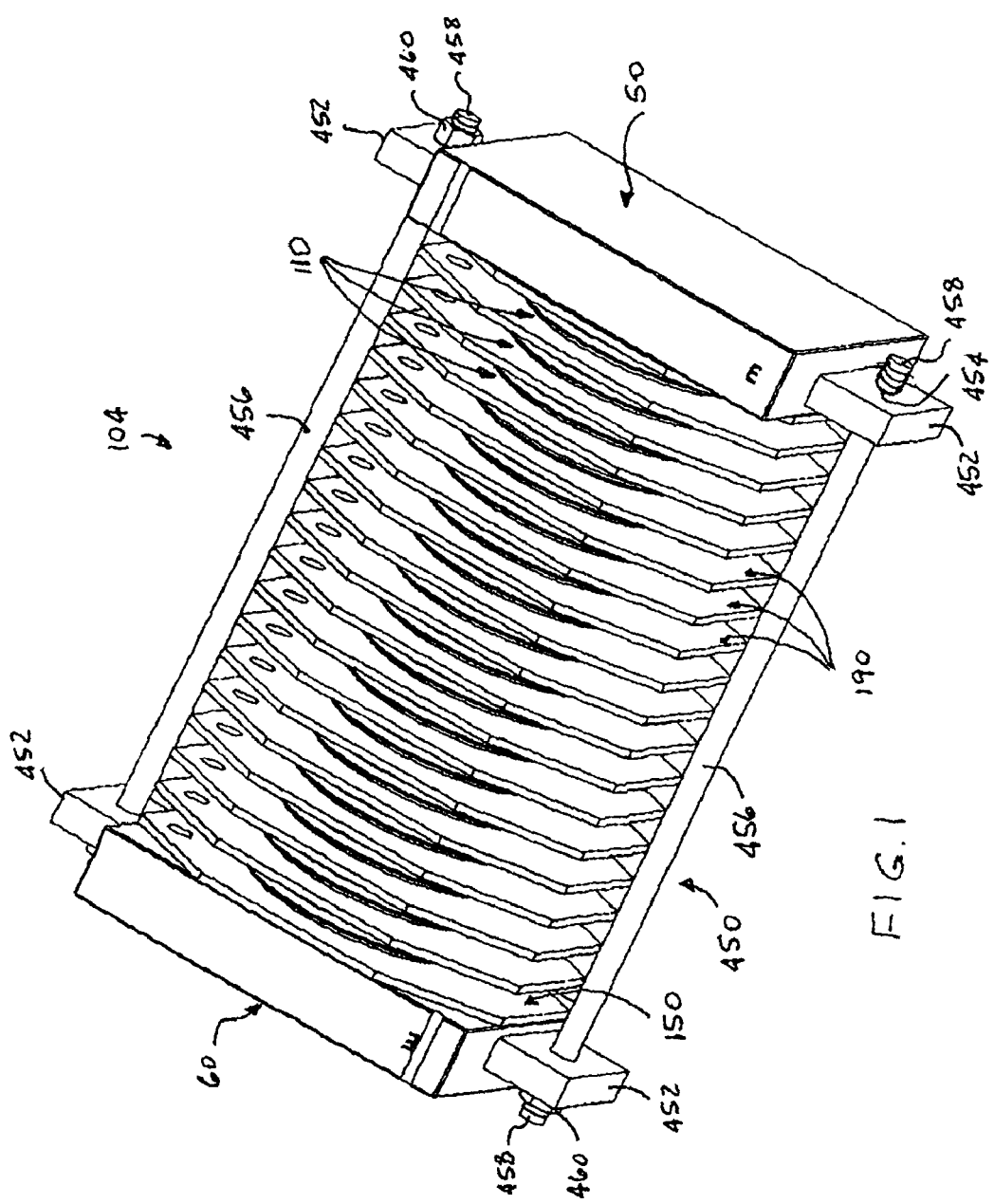
FIG. 1 is an isometric view of a compressible elastomeric spring of the present invention, particularly illustrating the method of pre-shortening the spring prior to its installation into a yoke of the railway vehicle.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a railway vehicle applies but is not limited to passenger railcar, freight railcar, locomotive and the like railway vehicles.

The present invention provides several methods of making a compressible elastomeric spring. The various structures of the related springs produced by the methods of the present invention are disclosed in the co-pending U.S. Ser. No. 12/150,809 entitled "Compressible Elastomeric Spring". Furthermore, the general methods of forming compressible elastomeric spring are disclosed in U.S. Pat. Nos. 4,198,037 and 5,351,844, whose teachings are incorporated into this document by reference thereto.

In accordance with one embodiment of the present invention, the method includes the step of providing at least one compressible elastomeric pad, generally designated as 110, defining a central axis and having a pair of axial ends. Each of the pair of axial ends has each of a substantially flat surface disposed normal to the central axis and a central raised projection formed thereon. The structure of such compressible elastomeric pad 110 is best disclosed in the co-pending U.S. Ser. No. 12/150,928 entitled "Elastomeric Pad For A Compressible Elastomeric Spring". Then, the method includes the step of providing a pair of members to cage or enclose the compressible elastomeric pad 110 therebetween. Preferably, each of the pair of members is a plate like member, generally designated as 150, having at least one substantially flat surface, an aperture 180 provided in at least one substantially flat surface thereof and a predetermined plurality of prongs 170 positioned about a peripheral edge 182 of the aperture 180 and extending at a predetermined angle relative to at least one substantially flat surface of each plate like member 150. Such plate like member 150 is best shown and described in the co-pending U.S. Ser. No. 12/150,926 entitled "Plate For A Compressible Elastomeric Spring".

Next, the compressible elastomeric pad 110 is positioned between the pair of plate like members 150 followed by alignment of the predetermined plurality of the prongs 170 of each plate like member 150 with a respective central projection 130 of the compressible elastomeric pad 110. After the compressible elastomeric pad 110 and the plate like members 150 are axially aligned, the compressible elastomeric spring 100 can be formed.

To form the compressible elastomeric spring 100 of the present invention, a predetermined force is applied axially to an exposed surface of one of the pair of plate like members 150. When the axial force is applied, each of the predetermined plurality of prongs 170 pierces an exterior surface of the central projection 130 and penetrates a predetermined distance at least into the central projection 130 providing for frictional engagement between the prongs 170 and the central projection 130 and establishing a mechanical interlock between the compressible elastomeric pad 110 and the abutting plate like member 150. The applied axial force is removed when such interlock is achieved.

It has been found that to achieve the above described mechanical interlock, the compressible elastomeric pad 110 must be precompressed again, to a height which is generally identical to the solid height of such compressible elastomeric pad 110. It has been also found that the axial force required to precompress the compressible elastomeric pad 110 and achieve the mechanical interlock with abutting plate like members 150 is between about 700,000 pounds and about 800,000 pounds. Advantageously, during the forming process, the applied axial force and the construction of the prongs 170 enables each central projection 130 to axially extend into the aperture 180 provided in a respective plate like member 150.

The method also includes the steps of forming a groove 140 in each substantially flat surface of the compressible elastomeric pad 110 in abutting engagement with a peripheral side surface of the central projection 130, aligning the prongs 170 with the groove 140, piercing the surface of the groove 140 and penetrating into the compressible elastomeric pad 110. To enable prongs 170 to pierce both the central projection 130 and the groove 140, the diameter of the central projection 130 is sized based on the thickness of the prongs 170 so that when each prong 170 pierces the exterior surface of the central projection 130, a portion of the prong 170 is exposed for piercing the surface of the groove 140. The method additionally includes the step of sizing the width of the groove 140 in a manner to align an exterior peripheral edge of the groove 140 with an exterior surface of the prongs 170.

The method also includes alternative steps of forming a plurality of apertures 148 in abutting engagement with the peripheral side surface of the central projection 130, aligning the prongs 170 with the apertures 148 and positioning each prong 170 within a respective aperture 148 during application of the axial forming force.

The method includes the additional steps of positioning a predetermined plurality of projections 160a,b on the substantially flat surfaces of each of the pair of plate like members 150, forming an aperture 164 through each of the predetermined plurality of projections 160a,b and each plate like member 150 and enabling the material of the compressible elastomeric pad 110 to flow into each aperture 164 during cold forming process of the compressible elastomeric spring 100.

Although the above method has been described as caging the compressible elastomeric pad 110 between the pair of plate like members 150, the present invention contemplates that at least one of such plate like members 150 may be replaced with a follower block 50, 60 or the center plate 200, best shown and described in the co-pending U.S. Ser. No. 12/150,777 entitled "Combination Yoke and Elastomeric Draft Gear".

In accordance with another embodiment, the invention provides a method of making a multi-tiered compression spring assembly, generally designated as 102. Such multi-tiered compression spring assembly 102 includes a predetermined plurality of axially disposed compressible elastomeric pads 110, a first end plate 150 on one end of the assembly, a second end plate 150 on an opposed end of the assembly and a separator plate 190 between each pair of adjacent compressible elastomeric pads 110. The notable distinction in forming the multi-tiered compression spring assembly 102 as compared to forming the compressible elastomeric spring 100 is that the plurality of prongs 170a, 170b are formed on every surface of the plates 190 which is in juxtaposition to one of the compressible elastomeric pads 110.

It has been discovered that making the multi-tiered compression spring assembly 102 in accordance with the above described method including the steps of providing prongs 170, 170a, 170b formed on the plates 150, 190 respectively, providing projection 130 and groove 140 formed on the compressible elastomeric pad 110, as well as making the compressible elastomeric pad 110 from a preselected copolyester polymer having a modified molecular structure and providing the compressible elastomeric pad 110 with a predetermined shape factor provides for at least one of axial straightness and lateral stability enabling such multi-tiered compression spring assembly 102 to repetitively cushion and absorb axial dynamic impact loads in excess of 7,500 pounds per square inch (PSI) and further within the range of between about 9,500 PSI and about 11,000 PSI in absence of a center rod or peripheral guidance.

Figure 2:
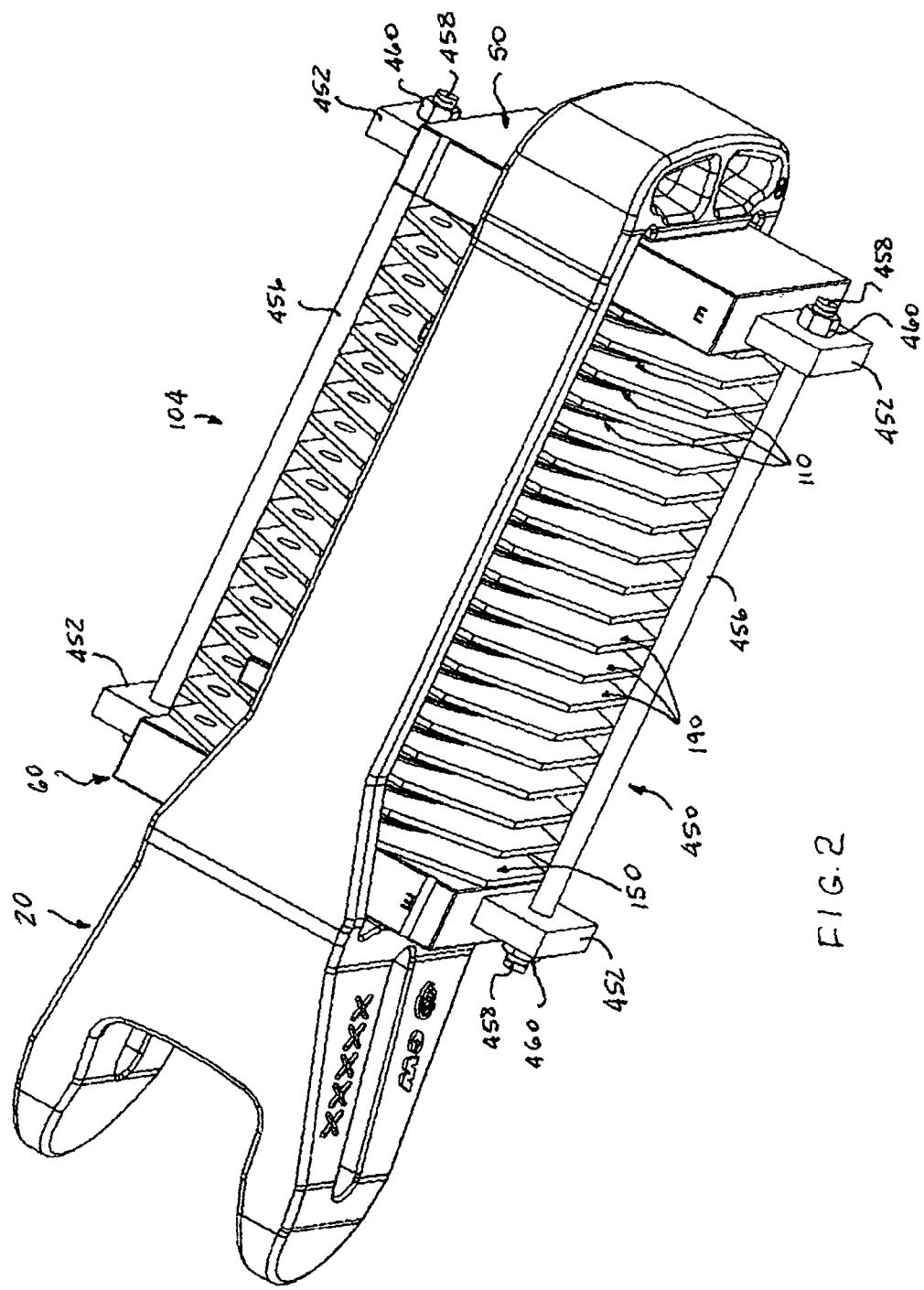
FIG. 2 is an isometric view of a compressible elastomeric spring of FIG. 1, particularly illustrating the spring installed into the yoke in a pre-shortened condition.
Figure 3:
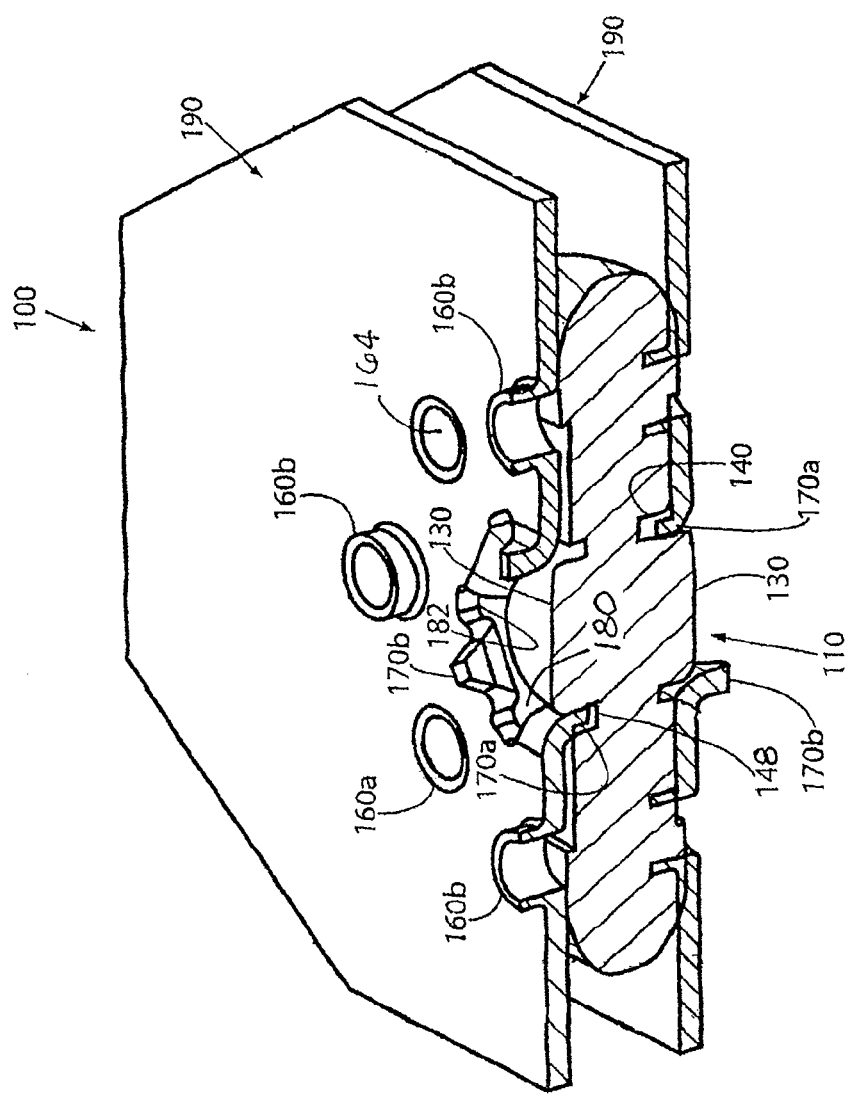
FIG. 3 is an isometric cross-sectional view of a compressible elastomeric spring constructed in accordance with one embodiment of the invention.
Figure 4:
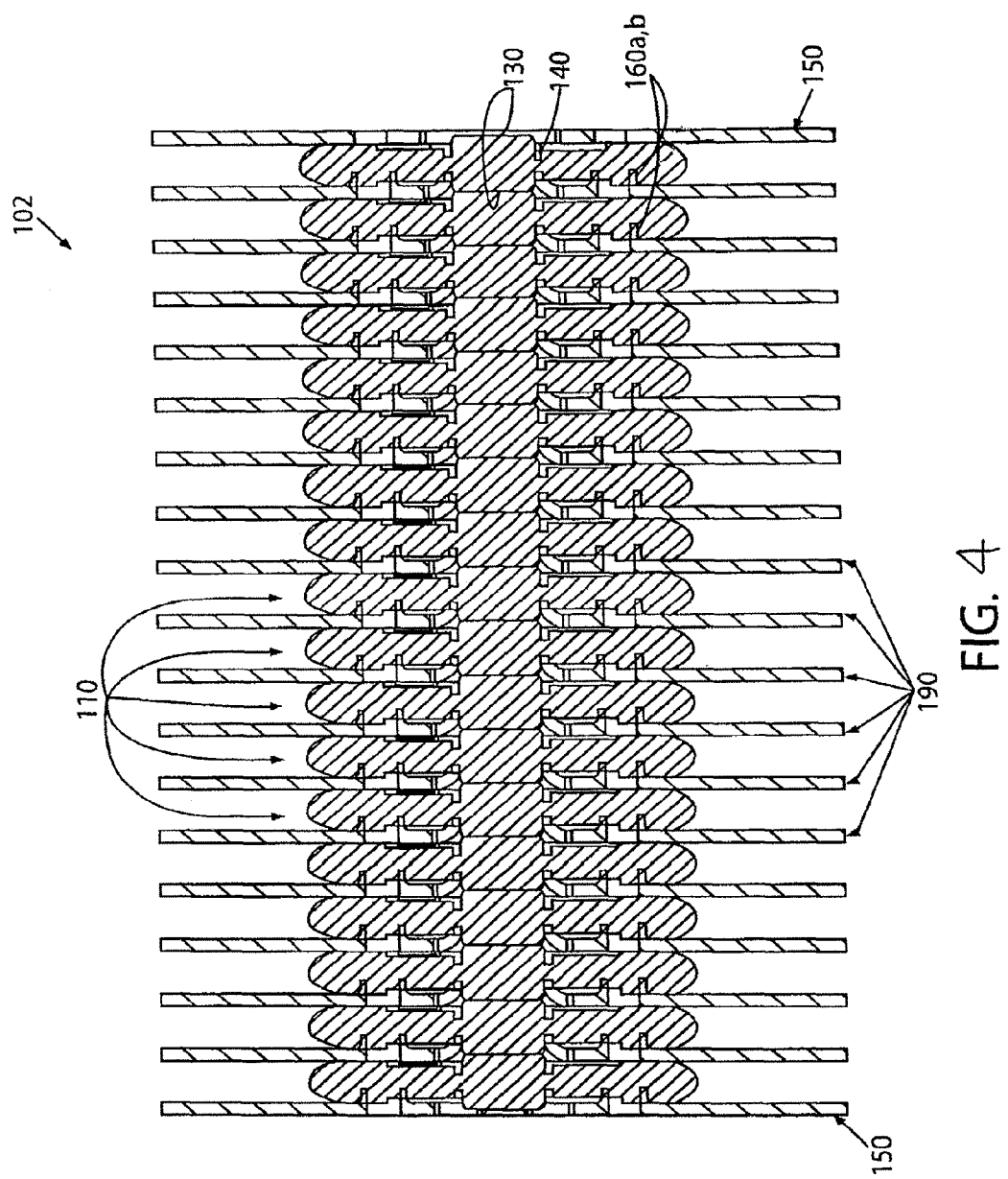
FIG. 4 is a cross-sectional elevation view of a compressible elastomeric spring constructed in accordance with another embodiment of the invention.
Figure 5:
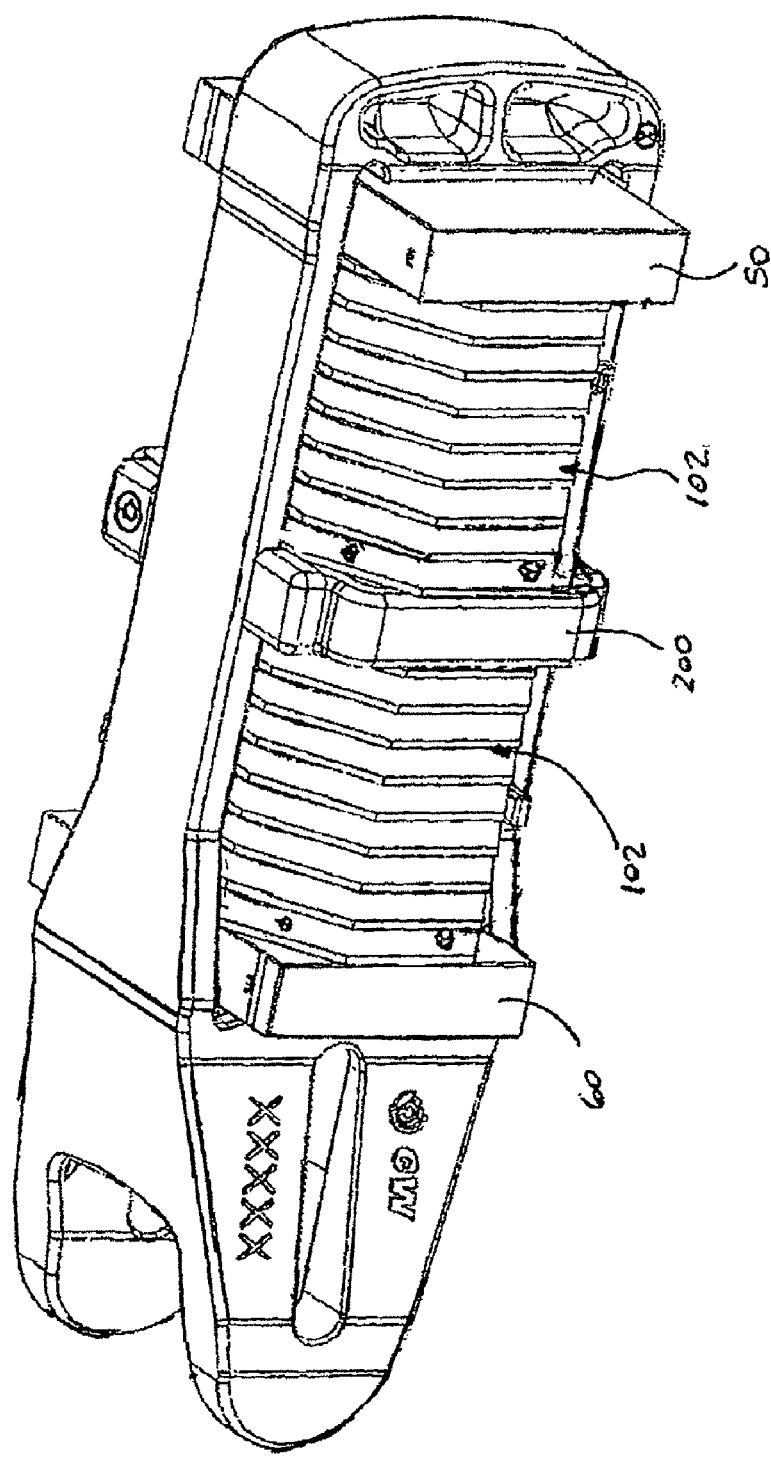
FIG. 5 is an isometric view of a draft gear assembly employing compressible elastomeric spring.

The present invention further provides for a method of pre-shortening the multi-tiered compression spring assembly prior to its installation into a conventional yoke, generally designated as 20. Now in reference to FIG. 1, there is illustrated a multi-tiered compression spring assembly, generally designated as 104, which includes a predetermined plurality of compressible elastomeric pads 110 and plates 150, 190 interlocked therebetween in accordance with the above described embodiments. The method of pre-shortening the multi-tiered compression spring assembly 104 also includes the step of adapting each of the rear follower block 50 and the front coupler follower block 60 with means, generally designated as 450, for fixing the assembled multi-tiered compression spring 104 at a predetermined pre-shortened height. In the presently preferred embodiment of the invention, such means 450 includes a flange 452 rigidly secured to or integrally formed with each side edge of each follower block 50, 60 and having an aperture 454 formed therethrough. The flanges 452 are positioned on a respective follower block 50, 60 in a manner aligning the opposed apertures 454 in the same plane, which is shown as a vertical plane in FIGS. 1-2, when the multi-tiered compression spring assembly 104 is installed into the yoke 20. Each follower block 50, 60 is operatively positioned at a respective end of the multi-tiered compression spring assembly 104 prior to application of the axial forming force. Thus, during forming, the compressible elastomeric pads 110, plates 150, 190 and follower blocks 50 and 60 are precompressed together. Then, the applied axial force is partially removed enabling the multi-tiered compression spring assembly 104 to return to a pre-shortened height which is smaller than the normal extended height of the multi-tiered compression spring assembly 104 and which enables installation of the multi-tiered compression spring assembly 104 with the follower blocks 50, 60 into the yoke 20 in a conventional manner. Next, a pair of rods 456 having threaded ends 458 are inserted through the aligned apertures 454. Fasteners, such as conventional threaded nuts 460 are operatively engaged at each threaded end 458 thus fixing the multi-tiered compression spring assembly 104 at the predetermined pre-shortened height. When the predetermined pre-shortened height of the multi-tiered compression spring 104 is fixed, the applied axial forming force is removed completely. After the multi-tiered compression spring assembly 104 is installed into the yoke 20, as best shown in FIG. 2, the nuts 460 are disengaged, preferably gradually and equally at each side of the multi-tiered compression spring assembly 104, from each threaded end 458, the rods 456 are removed and the multi-tiered compression spring assembly 104 is allowed to extend to its normal operating height and being maintained in a conventional preload condition, generally being defined by a preload force of between about 20,000 pounds and about 50,000 pounds. It would be appreciated that the preload condition will apply to various embodiments of the compressible elastomeric springs 100, 102 described in the co-pending applications.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A method of making a compressible elastomeric spring, said method comprising the steps of:
   (a) providing at least one compressible elastomeric pad defining a central axis and having a pair of axial ends, each of said pair of axial ends having a substantially flat surface disposed normal to said central axis and a central raised projection formed thereon;
   (b) providing a pair of plate members, each of said pair of plate members having at least one substantially flat surface, one of an aperture and a cavity provided in said at least one substantially flat surface thereof and a predetermined plurality of prongs positioned on or in close proximity to a peripheral edge of said one of said aperture and cavity and extending at a predetermined angle relative to said at least one substantially flat surface of said each plate member;
   (c) positioning said at least one pad between said pair of plate members;
   (d) axially aligning said predetermined plurality of said prongs of said each plate member with a respective central projection; and
   (e) forming said compressible elastomeric spring.

2. The method, according to claim 1, wherein step (e) includes the steps of applying a predetermined force axially to an exposed surface of one of said pair of plate members, piercing, with each of said predetermined plurality of prongs and said applied axial force, an exterior surface of said central projection, penetrating, with each of said predetermined plurality of prongs and said applied axial force, a predetermined distance at least into said central projection and removing said applied axial force.

3. The method, according to claim 2, wherein step (e) includes the additional step of axially precompressing said at least one pad to a predetermined height.

4. The method, according to claim 2, wherein step (e) includes the additional step of axially extending said central projection into said one of said aperture and cavity.

5. The method of claim 2, further including the additional steps of exposing a portion of each of said predetermined plurality of prongs.

6. The method, according to claim 1, wherein step (a) includes the step of forming a groove in each substantially flat surface of said at least one compressible elastomeric pad in abutting engagement with a peripheral side surface of said central projection.

7. The method of claim 6, further including the additional step of aligning an exterior peripheral edge of said groove with exterior surfaces of said predetermined plurality of prongs.

8. The method, according to claim 1, wherein said method includes the additional steps of positioning a predetermined plurality of projections on said substantially flat surface of said each of said pair of plate like members and forming an aperture through each of said predetermined plurality of projections and said each plate like member.

* * * * *